United States Patent Office 3,279,519
Patented Oct. 18, 1966

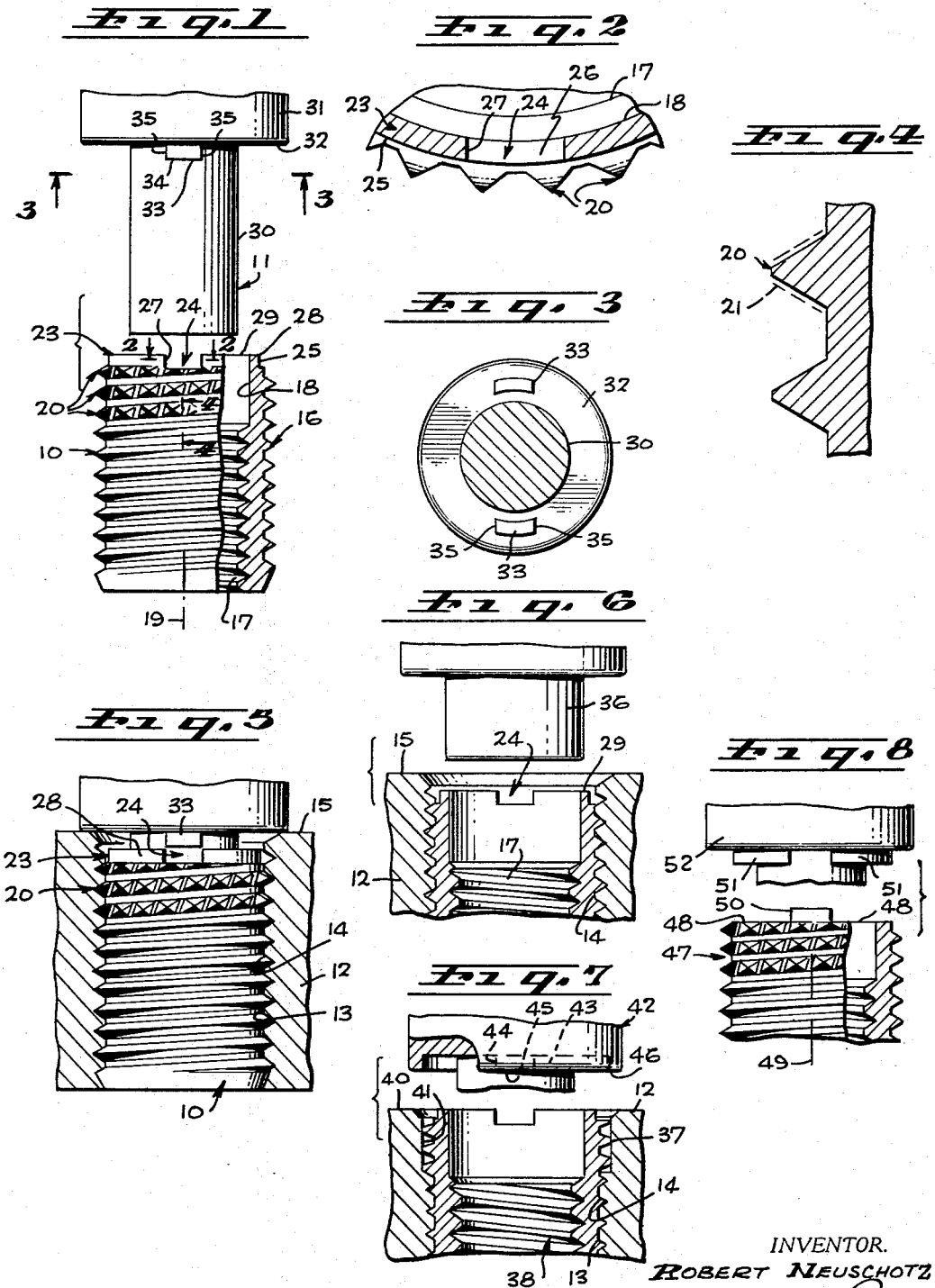

3,279,519
KNURLED LOCKING THREADED ELEMENT
Robert Neuschotz, 1162 Angelo Drive,
Beverly Hills, Calif.
Filed July 26, 1965, Ser. No. 474,746
2 Claims. (Cl. 151—41.73)

This application is a continuation-in-part of my copending application Serial Number 271,717, filed April 9, 1963, entitled "Structure and Installation of Knurled Locking Threaded Element" which is now abandoned.

The invention covered in this application relates to an improved type of threaded element, preferably taking the form of a threaded insert to be screwed into a carrier part for securing a stud to the carrier part by means of the insert. Certain features of novelty relating to a preferred method of forming the present elements are disclosed and claimed in my copending application Serial Number 286,122, filed June 6, 1963, entitled "Manufacture of Knurled Threaded Elements" now Patent No. 3,233,258. An additional feature of novelty which is disclosed in the present application is covered in my copending application serial number 271,703, filed April 9, 1963, entitled "Installation Of Elements Having Knurled Threads."

An important object of the invention is to provide a threaded element which can be very easily screwed to a predetermined accurately set installed position within a carrier part, and then be locked effectively in that position with maximum facility. As will appear, the element or insert is so constructed that a mating installing tool may function to drive the element until the desired fully installed position is reached, at which time the element automatically moves out of driving engagement with the tool, so that continued rotation of the tool does not advance the element farther. This driving engagement is effected by the provision of one or more drive projections on the tool and one or more mating drive lugs on the threaded element. For then locking the element in the set position within the carrier part, the element has a portion of its outer surface serrated, and adapted to be expanded radially outwardly into tight locking engagement with the carrier part to prevent rotation of the element. This serrated locking portion of the element is located near its axially outer end, and the driving lug or lugs on the element project axially outwardly for engagement with the coacting tool.

To enable interfitting rotary driving engagement of an installing tool with a threaded element of the present type, the element is provided at the axially outer end of its expansible tubular locking portion with a recess or recesses into which the projections of the driving tool may extend. One difficulty which may be encountered in installing an element of the present type within a carrier part involves the tendency for the side wall of the tubular locking portion to in some instances tear or break at the location of the mentioned recess when the locking portion is expanded radially outwardly and against the material of the carrier part. More specifically, the presence of one or more recesses in the locking portion may tend to cause an excessive amount of the radial expansion to occur at the somewhat weakened locations of these recesses. This excessive expansion may then cause tearing at the recess locations unless special provision is made to avoid such tearing. Any tearing of the insert wall is of course highly detrimental to the attainment of an effective rotary locking action since a tear in the wall reduces its strength and therefore reduces the effectiveness with which the serrations are held against the carrier part.

An important object of the invention is to so shape the mentioned tool receiving recess or recesses, in relation to the serrations of the tubular locking portion, and with respect to the configuration and orientation of the recesses themselves, as to eliminate the discussed tendency for tearing of the locking portion upon expansion. This is achieved partially by shaping the recesses to be very shallow axially, and specifically to have an axial depth which is much smaller than the axial extent of the serrated locking portion of the element, so that the reduction in strength of the element at the recess location is minimized. Additionally, the recesses are so configured as to have circular extents which are much greater than their very short axial depths, to thereby extend the recessed area over a substantial circular distance and thus spread over that distance whatever expansion may occur at the recessed area. The somewhat extended circular length of the recess also serves the function of enabling reception of a tool projection of a similar circular extent, so that the tool projection may be large enough to transmit adequate rotary forces to the element during installation. To define the shape of the recesses in greater detail, it is preferred that each recess have an extent circularly about the axis of the element which is at least about twice as great as the shallow axial depth of the recess.

To maximize the locking effectiveness obtained by expansion of the serrations radially outwardly against the carrier part, I prefer that the serrations on the installed element be formed as serrated portions of the external thread. Also it is desirable that the serrations be ultimately received within the internal thread in the carrier part. The serrations may then grip those mating threads much more positively than if the serrations were expanded outwardly against an unthreaded counterbore in the carrier part. However, since the tooth type driving tool may in many instances have a limited driving torque, particularly during the last portion of the driving action as the projections and lugs of the tool and driven element move out of engagement, it is desirable that the serrations of the threaded element initially advance into the thread of the carrier part with very little installation torque. A further object of the present invention is therefore to so design the serrated threads as to assure minimum friction with the carrier part threads prior to expansion. For this purpose, the serrated portions of the thread may desirably be shaped to fall substantially entirely within, and preferably completely within, a thread profile identical with that of the unserrated portions of the threads. Conventional knurling thickens the threads axially beyond the desired profile, and as a result, if the threads are serrated by knurling, they should be chased or cut away to the original profile after knurling, to avoid excessive friction as discussed.

The above and other features and objects of the invention will be better understood from the following detailed description of the typical embodiments illustrated in the accompanying drawing in which:

FIG. 1 is a side view, partially broken away, illustrating a threaded insert constructed in accordance with the invention, and showing also a tool used for screwing the insert into a carrier part;

FIG. 2 is an enlarged fragmentary section taken on line 2—2 of FIG. 1;

FIG. 3 is a section taken on line 3—3 of FIG. 1;

FIG. 4 is a greatly enlarged fragmentary axial section taken on line 4—4 of FIG. 1;

FIG. 5 is a view showing the insert of FIG. 1 after it has been screwed into a mating carrier part;

FIG. 6 shows the insert of FIG. 5 after expansion to its locking condition; and

FIGS. 7 and 8 are views similar to FIG. 1, but showing two variational forms of the invention.

Referring first to FIG. 1, I have illustrated at 10 a threaded insert constructed in accordance with the invention, and adapted to be screwed by a tool 11 into a carrier part of the type illustrated at 12 in FIGS. 5 and 6. This carrier part 12 contains a bore 13 having internal threads 14 extending axially inwardly from a planar outer surface 15 of the carrier part.

The insert 10 takes the form of a tubular body having external threads 16 of uniform major and minor diameter and adapted to be screwed into and mate with internal threads 14 of the carrier part. The insert also has internal threads 17 into which a threaded bolt or stud may be screwed after the insert has been installed in the carrier part, to thereby connect the bolt or stud to the carrier part through the medium of the insert. Axially outwardly of internal threads 17, the insert contains an internal straight cylindrical counterbore 18, typically of a diameter corresponding to the major diameter of internal threads 17, and centered about the same axis 19 as are threads 16 and 17.

External thread 16 of the insert has an axially outer portion radially opposite inner counterbore 18, which is knurled to form a series of serrations or teeth 20 (FIGS. 1, 2 and 4), for use in locking the insert within the carrier part. These serrations may continue through a substantial portion of the thread, preferably at least a complete turn, and desirably a plurality of turns (for best results approximately three complete turns of the thread). The serrations 20 may be formed by a conventional knurling tool, that is, by holding such a tool against the threads as the insert is turned, and desirably prior to internal boring of the insert.

When the serrations are initially formed by the knurling operation, the knurling tool acts to deform the material of the engaged thread in order to form the depressions or recesses at 21 in FIG. 2, and in thus deforming the material of the thread, the knurling tool thickens or spreads the material of the thread axially to a thickened condition. This is brought out in FIG. 4, in which one of the unknurled turns of the thread is represented at 16a, with the thickened condition of one of the knurled serrations being represented in broken lines in FIG. 4 at 21. Following the knurling operation, a thread chaser is screwed onto insert 10, and past the axially thickened serrations, to cut away the axially spread material and reduce the serrations to the full line profile represented at 20 in FIG. 4. This ultimate profile or cross section of the serrations may correspond exacty to, and be a helical continuation of (or if desired may be very slightly larger than but still correspond substantial to), the cross section or profile of the unknurled portions of the thread, as represented at 16a in FIG. 4. Thus, the serrations in their final condition may be screwed into any thread which will mate with the unknurled portions of the thread 16.

At its axially outer or upper end, insert 10 terminates in an axially outer end surface 29, which is disposed essentially transversely of axis 19, and preferably is planar and disposed precisely transversely of that axis. For turning the insert during installation, the side wall of the insert body contains one or more driving recesses or notches 24, which extend axially into the side wall from and beyond the plane of outer end surface 29. Preferably, there are two such driving recesses at diametrically opposite locations. These recesses may be considered as dividing an axially short end driving portion of the insert into a pair of essentially semi-circular driving lugs or teeth 28, defined at their axially outer end by two portions of planar end surface 29 of the insert. Driving tool 11 has two diametrically opposite projections 33 which project into recesses 24 of the insert in rotary driving relation. Each recess 24 may be defined by an inner surface 26 and two side walls 27. At least one of the side walls 27, specifically the side wall which is located at the circularly leading side of the recess as the insert is screwed into a carrier part, should extend essentially axially to effectively transmit rotary forces from the tool to the insert. Desirably, this leading side wall 27 extends substantially directly axially to form an abrupt drive shoulder engageable by the tool. In the preferred arrangement, both of the sides 27 of the recess extend essentially axially, and preferably are planar and parallel to one another as seen in FIG. 1. Also, it is desirable that inner surface 26 of the recess be planar and disposed transversely of axis 19, and perpendicular to the surfaces 27. Thus, the recesses 24 preferably have the configuration of a rectangle when viewed (as in FIG. 1) radially inwardly from the outside of the insert, or as seen when looking radially outwardly from axis 19 toward one of the recesses.

As will be apparent from FIG. 1, the recesses 24 in insert 10 have a shallow depth axially which is small as compared with the axial extent of the tubular locking portion of the device on which serrations 20 are formed. For optimum results, the overall axial extent of the serrated portion of the insert body is at least two times as great (more desirably at least about three times as great) as the axial extent or depth of each recess 24. Further, it is found desirable that the length of each recess 24 circularly about axis 19 be substantially greater than the axial depth or extent of the recess, and preferably at least about two times as great as the axial depth of the recess.

In many instances it is found desirable that the upper driving portion 23 of the insert, which forms lugs 28 and recesses 24, be externally unthreaded, and have an outer cylindrical surface 25 centered about axis 19, and of a diameter which may be as small as or smaller than the minor diameter of thread 16.

Driving tool 11 has a typically cylindrical shank 30 adapted to project into and be a relatively close fit within inner threads 17 of the insert. The driving tool also has an enlarged diameter portion 31 forming an annular planar shoulder 32 disposed transversely of axis 19. At two diametrically opposite locations, shoulder 32 carries a pair of the previously mentioned axially extending projections 33 dimensioned and positioned to fit within notches 24 in rotary driving relation. Surfaces 34 and 35 of the projections 33 are adapted to engage surfaces 26 and 27 respectively of the insert. As will be apparent from FIG. 1, the lugs 33 desirably have substantially the same rectangular configuration previously discussed in connection with recesses 24, as the lugs appear when viewed looking radially toward the lugs.

To now describe the manner of installation of the insert of FIG. 1, the first step is to place the insert about shank 30 of installing tool 11, with projections 33 of the tool fitting into recesses 24, and therefore being received in axially overlapping driving engagement with the axially projecting lugs or teeth 28 of the insert. With the tool and insert in this relative condition, the insert is screwed into the carrier part, to the condition of FIG. 5, by turning and axially advancing tool 11. As the tool turns, projections 33 act to turn lugs 28 of the insert, and therefore the insert itself, by engagement of two of the axially extending surfaces 35 of the tool with two of the axially extending surfaces or shoulders 27 of the insert, at the circularly leading sides of recesses 24. When the tool reaches the position of FIG. 5, the radially outer portion of surface or shoulder 32 of the tool engages surface 15 of the carrier part, to prevent further axial advancement of the tool. Rotation of the tool, however, is continued, so that the insert continues to advance into the carrier part until the insert reaches the illustrated FIG. 5 position at which projections 33 are no longer received within recesses 24, and therefore are no longer in driving engagement with the lugs 28 of the insert. Thus, the insert automatically stops at the FIG. 5 setting, even though the tool continues to turn. During the final portion of the rotary driving action, only a very small tip end of each projection 33 engages and turns the insert, so that the available torque at this time is limited. It is for this reason that the minimization of resistance to turning of the insert is highly important, and consequently the reduction in axial thickness of the spread serrations from the broken line condition of FIG. 4 to the full line condition of that figure is an extremely important feature. If the serrations were left in their broken line spread condition of FIG. 4, a very substantial resistance to turning of the insert would be encountered as the serrations entered the carrier part threads, and this resistance might be sufficient to damage the insert or installing tool, or prevent complete installation of the device.

After the insert has reached the FIG. 5 position, the serrated portion of the insert is expanded radially outwardly against the mating portions of the carrier part thread, as by means of an expanding tool of the type illustrated at 36 in FIG. 6. This tool may be externally cylindrical, and of a diameter slightly greater than the initial internal diameter of counterbore 18, so that as tool 36 is forced axially into the counterbore, it annularly expands the serrated portion of the insert radially outwardly. Upon such expansion, the external surface 25 of the outer driving portion 23 of the insert preferably does not reach a great enough diameter to contact or exert substantial force against the carrier part, so that the exposed end of the insert is not deformed and presents an accurately flat outer end surface. If the external thread 16 were allowed to continue to the plane of end surface 29, the driving lugs themselves would be expanded against the carrier part, and might be deformed in a manner causing the outer surfaces 29 to project outwardly unevenly, perhaps beyond the outer surface 15 of the carrier part, and detract from the appearance of the installed unit.

The shallowness of recesses 24 as compared with the greater axial extent of the expanded serrated portion of the insert minimizes any tendency for increased expansion of the insert wall at the recessed locations, since the shallow recesses do not substantially reduce the strength of the insert wall at the locations of the recesses. Also, the formation of recesses 24 to be elongated circularly, as compared with their shorter axial depth, enables the formation of two projections 33 to have sufficient circular extent, and therefore sufficient strength, to adequately transmit rotary forces to the insert, and to avoid damage to or deterioration of the projections or lugs 33 from repeated installation procedures. Additionally, the formation of the recesses 24 to have greater circular than axial extents serves to distribute any slight tendency for excessive stretching or expansion of the insert material at the recessed locations over a sufficient circular extent to, in combination with the other factors discussed above, prevent any tearing of the insert wall upon expansion.

FIG. 7 is a view similar to FIG. 1, but showing a variational form of the insert which is identical with the first form except that the serrated portion of the insert thread is not cut back to the initial thread profile after the knurling operation. Thus, the serrations 37 of insert 38 of FIG. 7 are thicker axially than are the unknurled portions of the thread. This arrangement is for most purposes less desirable than that of FIGS. 1 through 6, but may be utilized where the insert is to be screwed into a carrier part 40 having a counterbore 41 for receiving the knurled portions of the thread. In such a case, the counterbore may be dimensioned to receive the serrations without excessive friction, with the serrations then being expanded radially outwardly against the counterbore and into locking engagement therewith after the insert has been screwed to an installed position by a tool such as that shown at 11 in FIG. 1.

The tool 42 of FIG. 7 is typically illustrated as one designed to install the insert in a flush relationship with respect to outer surface 40 of the carrier part. For this purpose, tool 42 contains an essentially annular recess 43, disposed about shank 44 and of a size to receive the end of insert 38. Recess 43 contains two drive projections 44 whose end surfaces 45 are aligned with the outer annular carrier part engaging surface 46, so that the lugs cease to drive when the insert is flush.

A flush drive tool of this type may of course also be used in driving the first form of insert. Thus, in either form, the tool may be designed to drive the insert to a very accurately predeterminable position, either flush with or a desired distance beneath (or above) the surface of the carrier part.

Another form of the invention, whose structure will be apparent without specific illustration, may correspond exactly to the showing of FIGS. 1 through 6, except for the continuation of external thread 16 axially outwardly to the plane of outer surface 28, with cylindrical surface 25 then being deleted from the device.

FIG. 8 shows another variational form of the invention which may be considered as identical with that of FIG. 1, except that the insert 47 of FIG. 8 has recesses 48 (corresponding to recesses 24 of FIG. 1) each of which extends circularly through almost 180 degrees about axis 49. The two diametrically opposite lugs 50 (corresponding to lugs 28 of FIG. 1) then extend circularly through a much shorter extent, typically corresponding to the circular extent of the recesses 24 in FIG. 1. The projections 51 of tool 52 (corresponding to projections 33 of tool 31 in FIG. 1) have circular extents as great as recesses 48, to fit within those recesses and effectively rotatively drive the insert into a carrier part.

This FIG. 8 form of the invention is installed in the same manner discussed in connection with the FIG. 1 form, and has the advantages of that form. In addition, the FIG. 8 arrangement has the added advantage of further decreasing any tendency for localization of expansion forces at a particular recessed area, since the recesses 48 are in FIG. 8 so long circularly as to distribute any tendency for increased expansion at the recessed areas over almost the entire 360 degree extent of the insert wall. That is, the only locations at which the side wall of the insert of FIG. 8 may have slightly increased strength, and may therefore have slightly increased resistance to expansion, are the locations of projections 50, which have very small circular extents. In this form of the invention, it is preferred that the circular extent of each recess 48 be many times as great as its axial depth, and as in the first form of the invention, it is desirable that the axial depth of each recess be small as compared with the axial extent of the expansible serrated area.

It is contemplated that the features of the present invention may be applied also to arrangements having serrations of other than thread shaped configuration. For example, in FIG. 4, the serrations might be of any shape capable of expansion outwardly into locking engagement with counterbore surface 41.

I claim:
1. An element comprising a body having external first threads disposed about an axis and adapted to be screwed into a mating thread in a carrier part, said body having second threads for connection to another member, said body having a radially expansible essentially tubular locking portion near the axially outer end of the body carrying a first portion of said external threads which is shaped to present a series of radially outwardly projecting serrations at different locations along the circular extent of said portion of the external threads, said external threads having a non-serrated second portion axially inwardly of said first portion, said locking portion of the body containing an essentially axially extending internal surface near its axially outer end and radially opposite said serrations for engagement by a tool to expand said locking portion, said locking portion being formed of a material capable of substantial expansion without tearing, said locking portion terminating at its axially outer end in an axially outer end surface and having a short non-serrated essentially cylindrical external surface of arcuate cross section axially outwardly of said serrations and extending axially between the serrations and said outer end surface, said locking portion containing at least one recess extending axially inwardly into the material of said tubular locking portion from said outer end surface and extending through the entire radial thickness of the wall of said locking portion, said recess being confined substantially to the location of said non-serrated essentially cylindrical external surface, said body forming at least one driving lug at said axially outer end thereof at a location circularly offset from and adjacent and defining a side of said recess and projecting axially outwardly to said outer end surface to coact with a tool projection received in the recess, said recess having a shallow depth axially which is small as compared with the axial extent of said serrated tubular locking portion of the body, said serrations of the locking portion extending axially inwardly a substantial distance beyond said recess, said locking portion being circularly continuous beyond said recess, said recess having a circular extent which is at least about twice as great as said shallow axial depth thereof for reception of a tool projection of adequate size and strength to turn the element into the carrier part, and to prevent undue localization of expansion forces at the recess, said recess having at the side thereof which is its circularly leading side during installation a short drive shoulder which extends essentially axially and is engaged in driving relation by said projection of the tool, said serrations having a cross section falling entirely within a thread profile identical with that of said second portion of the external threads.

2. An insert comprising a generally tubular body having external threads disposed about an axis and adapted to be screwed into a mating thread in a carrier part and having internal threads for receiving a stud or the like, said body having a radially expansible essentially tubular locking portion near the axially outer end of the body carrying a first portion of said external threads which is shaped to present a series of radially outwardly projecting serrations at different locations along the circular extent of said portion of the external threads, said external threads having a non-serrated second portion axially inwardly of said first portion, said serrations having a cross section falling entirely within a thread profile identical with that of said second portion of the external threads, said locking portion of the body containing an unthreaded counterbore at its axially outer end radially opposite said serrations for engagement by a tool to expand said locking portion, said body having an axially outer end surface disposed essentially transversely of said axis, said body having a short unthreaded essentially cylindrical external surface of circular cross section axially outwardly of said serrations and extending axially between the serrations and said outer end surface, said body containing a plurality of circularly spaced recesses extending axially inwardly into the material of said body from said outer end surface and interrupting said short unthreaded external surface and confined substantially to the location of said unthreaded external surface, said recesses extending through the entire radial thickness of the wall of said tubular body, said body forming a plurality of driving lugs at said axially outer end of the body at locations circularly between and adjacent and defining said recesses and projecting axially outwardly beyond the material of the body at the recess locations to coact with tool projections received in the recesses, said recesses being of rectangular shape as viewed when looking radially outwardly toward each of the recesses from said axis, said rectangular recesses having a shallow axial depth which is small as compared with the axial extent of said serrated portion of the external threads, said serrations of the locking portion extending a substantial distance axially inwardly beyond said recesses, said locking portion being circularly continuous beyond said recesses, each of said recesses having a circular extent which is at least about twice as great as said shallow axial depth thereof.

References Cited by the Examiner

UNITED STATES PATENTS

| | | | |
|---|---|---|---|
| 2,390,514 | 12/1945 | Cram. | |
| 2,742,074 | 4/1956 | Rosan | 151—41.73 |
| 2,822,014 | 2/1958 | Cummaro | 151—41.73 |
| 2,855,970 | 10/1958 | Neuschotz | 151—41.73 |
| 2,886,090 | 5/1959 | Rosan | 151—41.73 |
| 3,081,808 | 3/1963 | Rosan et al. | 151—41.73 |
| 3,130,765 | 4/1964 | Neuschotz | 151—41.73 |

CARL W. TOMLIN, *Primary Examiner.*

M. PARSONS, JR., *Assistant Examiner.*